March 27, 1962 F. E. CRAIG 3,027,490
POLYPHASE FLUORESCENT LIGHTING SYSTEM
Filed Jan. 11, 1957 3 Sheets-Sheet 1

INVENTOR.
Frederick E. Craig
BY Morse & Altman
ATT'YS

March 27, 1962  F. E. CRAIG  3,027,490
POLYPHASE FLUORESCENT LIGHTING SYSTEM
Filed Jan. 11, 1957  3 Sheets-Sheet 2

INVENTOR.
Frederick E. Craig
BY Morse & Altman
ATT'YS

March 27, 1962 F. E. CRAIG 3,027,490
POLYPHASE FLUORESCENT LIGHTING SYSTEM
Filed Jan. 11, 1957 3 Sheets-Sheet 3

INVENTOR.
Frederick E. Craig
BY Morse & Altman
ATT'YS

United States Patent Office 3,027,490
Patented Mar. 27, 1962

3,027,490
POLYPHASE FLUORESCENT LIGHTING SYSTEM
Frederick E. Craig, 150 Liberty St., Lynn, Mass.
Filed Jan. 11, 1957, Ser. No. 633,756
6 Claims. (Cl. 315—144)

The present invention relates to illumination and, more particularly, to illuminating devices comprising a plurality of light sources energized by various phases of polyphase alternating current.

The primary object of the present invention is to provide in an illuminating device, a plurality of illumination sources that are supplied with polyphase current through a novel ballast arrangement that comprises magnetically discrete ballast components for respectively energizing the illumination sources, each ballast component including magnetically coupled current transforming and limiting inductors that give rise to efficient power consumption and uniform light production by minimizing heating loss and current variation.

Other objects of the present invention are: to provide an illuminating device of the foregoing type in which the illumination sources are powered through inductors in a star circuit; to provide an illuminating device of the foregoing type in which the illuminaton sources are powered through inductors in a mesh circuit; to provide an illuminating device of the foregoing type which conveniently incorporates sockets that deliver sufficiently high voltage initially to energize the lamps when properly installed but that prevent that voltage from endangering a person who carelessly may insert a lamp into its sockets while energized; to provide an illuminating device of the foregoing type in which each ballast component includes a transformer and a magnetic leakage element in association with the transformer core that operates as a reactor to limit current flow; to provide an illuminating device of the foregoing type in which radio frequency interference is avoided by the symmetry of three phase circuitry that interconnects the component ballasts and the illumination sources; and to provide an illuminating device of the foregoing type comprising inductors provided with inexpensive but efficient cores of novel construction.

Further objects of the present invention will in part be obvious and will in part appear hereinafter.

For a complete understanding of the present invention reference should be had to the following detailed disclosure, taken in connection with the accompanying drawings wherein.

Figure 1:
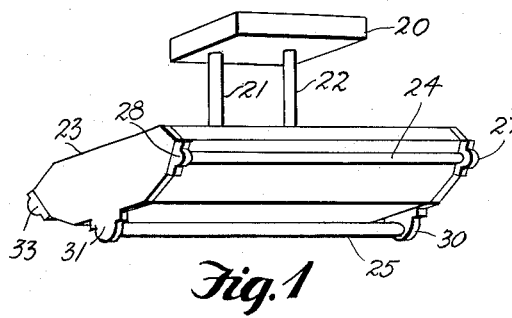
FIG. 1 is a perspective view of an embodiment of the present invention in the form of a lighting fixture having three tubular fluorescent lamps.
Figure 2:
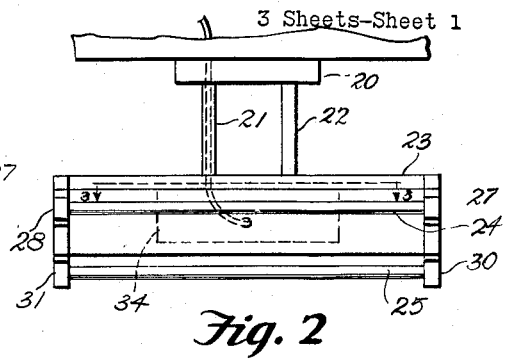
FIG. 2 is a front elevation of the fixture shown in FIG. 1, the broken lines representing a casing that contains a ballast arrangement for the fluorescent lamps.

The fixture illustrated in FIGS. 1 through 4 comprises a canopy 20, to be mounted on the under side of a ceiling or other overhead support. Suspended from canopy 20 by a pair of tubular stems 21 and 22 is an elongated housing 23. Extending in the direction of elongation of housing 23 and carried thereby are three gas filled fluorescent lamps 24, 25 and 26 (FIGS. 1, 2 and 4), each of which has opposed electrodes at its opposed ends. The pairs of opposed electrodes of tubes 24, 25 and 26 project into sockets 27 and 28, 30 and 31, and 32 and 33, respectively, which constitute components of the electrical circuit to be described below in detail.

Figure 3:
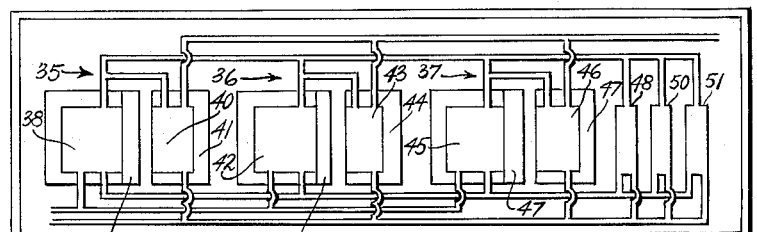
FIG. 3 is an enlarged detail view of the ballast arrangement of FIG. 2, taken substantially along the line 3—3.
Figure 4:
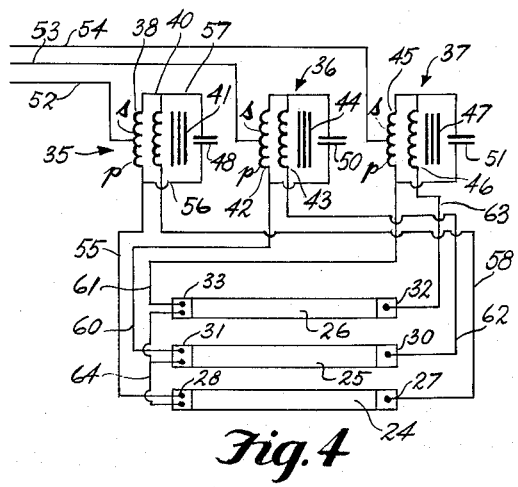
FIG. 4 is a diagram illustrating the components of the device of FIG. 1 connected in a star circuit.

A compartment for the ballast components of the fixture is shown in dotted lines at 34 secured within housing 23 to its upper wall. Mechanical and electrical details of the ballast components within compartment 34 are shown in FIGS. 3 and 4, respectively. These components include three current transforming and limiting units 35, 36 and 37, unit 35 including an autotransformer 38 and a choke 40 having a common core 41, unit 36 including an autotransformer 42 and a choke 43 having a common core 44, and unit 37 including an autotransformer 45 and a choke 46 having a common core 47. In order to maximize the efficiency of power consumption by lamps 24, 25 and 26, power factor capacitors 48, 50 and 51 are provided. Units 35, 36 and 37 are substantially identical and capacitors 48, 50 and 51 are substantially identical so that stray currents generated by ambient radio frequency energy oppose each other by virtue of the symmetry of the system. In consequence no radio frequency capacitors need be provided to prevent flickering which would otherwise be caused by such stray currents.

Reference is directed to the circuit diagram of FIG. 4 for an explanation of the relationships between the lamps and the ballast components. Extending into compartment 34 through stem 21 are three input leads 52, 53 and 54 from a three phase alternating current source. Leads 52, 53 and 54 are connected, respectively, to the center taps of autotransformers 38, 42 and 45, each shown as having a primary winding designated by $p$ and a secondary winding designated by $s$. The primary winding of autotransformer 38 is connected by a conductor 55 to the low potential socket 28 of lamp 24 and by a conductor 56 to one terminal of power factor condenser 48. The secondary winding of transformer 38 is connected by a conductor 57 to the opposite terminal of power factor condenser 48 and to one terminal of reactor 40. The opposite terminal of reactor 40 is connected by a conductor 58 to high voltage socket 27 of lamp 24.

The primary windings of transformers 42 and 45 are connected by conductors 60 and 61 to the low potential sockets of lamps 25 and 26, respectively; reactors 43 and 46 are connected by conductors 62 and 63 to the high potential sockets of these lamps; connections essentially like those above described are made among the secondary windings of transformers 42 and 45, power factor condensers 50 and 51 and reactors 43 and 46, respectively. Also, connections essentially like those above described are made among the primary windings of transformers 42 and 45 and power factor condensers 50 and 51.

Each of low potential lamp sockets 28, 31 and 33 have two separate terminals to bear on the metal fitting at the low potential end of an associated lamp tube. In the circuit diagram of FIG. 4, one terminal of each of lamp sockets 28, 31 and 33, as indicated above, is connected to the primary of each of the transformers 38, 42 and 45. The other terminals of lamp sockets 28, 31 and 33 are shunted together by a branched conductor 64. In this way, transformers 38, 42 and 45 are connected in a three phase Y circuit, of which shunt 64 is the center. The metal terminal fitting of any socket bridges the separated terminals of an installed lamp so that when all of the lamps are installed, the Y circuit connections of the three transformers are completed. However, when any lamp is removed, the circuit between the primary of the transformer with which that lamp is related and shunt 64 is broken. This arrangement thus serves to ensure the safety of a person who in replacing a defective lamp by inserting one end of the new lamp into its high voltage socket while holding the other end, could be subjected to a dangerous voltage. The foregoing connection causes the voltage in the circuit of any lamp to be reduced to a safe degree when the lamp is removed. Thus if lamp 24 has been removed, no current passes through the primary winding of transformer 38. Since, therefore, the voltage is not stepped up in the secondary winding of that transformer, the voltage from power line 52 applied through the secondary winding of transformer 38 and reactor 40 is too low to energize lamp 24. Consequently, a person who may place one end of lamp 24 in socket 27 while handling it in the careless manner described is protected from passage of current through his body.

Cores 41, 44 and 47 and the metal shells in which power factor condenser 48, 50 and 51 are encased are all grounded through an insulated conductor 65 that is connected to compartment 34 at 66 and to the cores and shells by branches 67.

Figure 6:
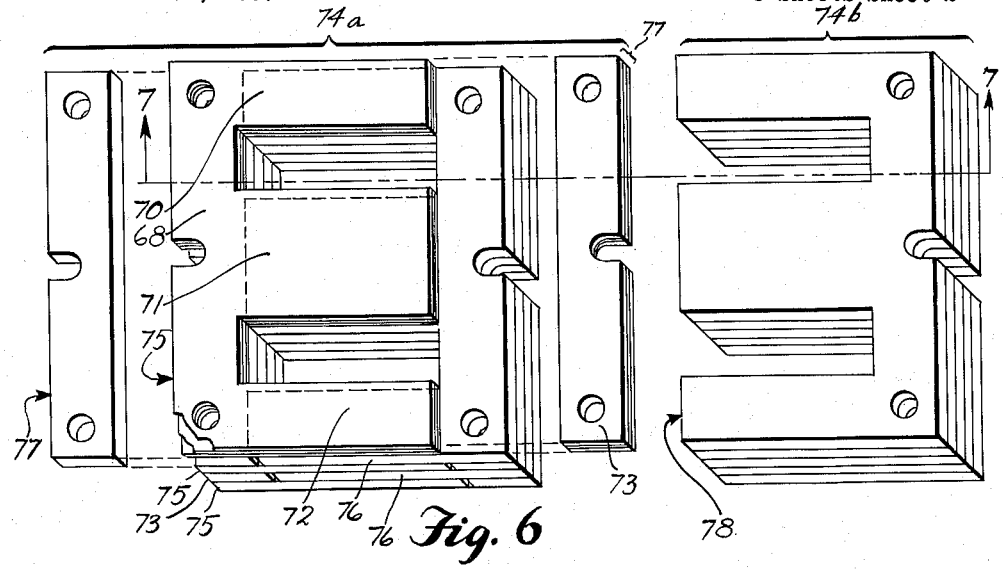
FIG. 6 is a perspective view of elements from which a core of the ballast arrangement of the device of FIG. 1 is constructed.

Cores 41, 44 and 47 are fabricated from a plurality of stacks of three sheet iron components (.026 inch thick) that are E- and I-shaped in outline as shown in FIG. 6. The coils with which these cores are associated are pre-wound. Each E-shaped component (FIG. 6) includes an elongated trunk 68 and three lateral branches 70, 71 and 72 extending in the same direction from the ends and center of the trunk. Each I-shaped component 73 has the same length and width as a trunk portion 68.

Figure 7:
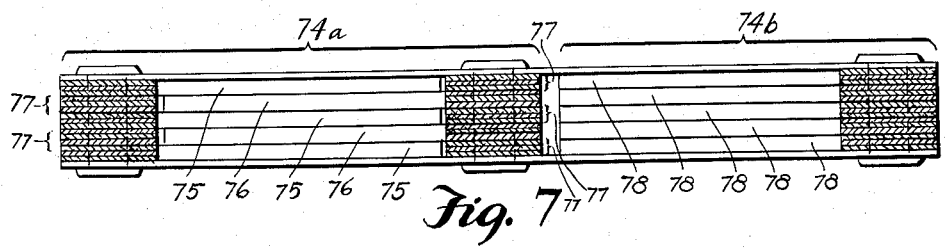
FIG. 7 is a cross-sectional view of the core of FIG. 6, the section being taken substantially along the line 7—7 of FIG. 6.
Figure 8:
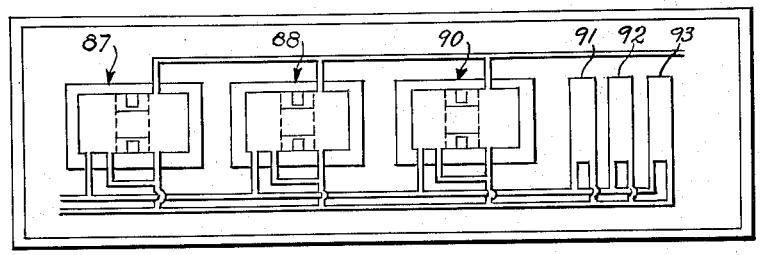
FIG. 8 is an enlarged detail view of a ballast arrangement alternative to that of FIG. 2.

As shown in FIGS. 6 and 7, the core of each unit 35, 36 and 37 is fabricated from a plurality of stacks each of three registered E-shaped elements or three registered I-shaped elements. In particular, the core of each unit comprises a component 74a carrying an autotransformer and a component 74b carrying a reactor. Autotransformer component 74a includes stacks 75 of three E-shaped elements each, whose branches are directed to the right as viewed in FIG. 7, and stacks 76 of three E-shaped elements each whose branches are directed to the left as viewed in FIGURE 7. Stacks 75 and 76 are interleaved with their branches in overlapping relation. Interleaved between the trunks of these stacks are stacks 77, of three I-shaped elements each. The prewound coil of one of transformers 38, 42 and 45 envelops medial branches 71 of the E-shaped elements and is embraced by trunks 68 and branches 70 and 72 of the E-shaped elements and by the I-shaped elements. Reactor component 74 of the core includes stacks 78 of three E-shaped elements each, whose branches are directed to the left as viewed in FIG. 7. The prewound coil of one of the reactors 40, 43 and 46 envelops medial branches 71 of the E-shaped elements and is embraced by trunks 68 and end branches 70 and 72 of the E-shaped elements. The free ends of medial and end branches 71, 70 and 72 are predeterminately spaced from the edges of transformer component 73, to which they are adjacent, by a distance which controls the current that flows through the reactor coil. Once adjusted these gaps are filled with permanent insulation.

The transformer and reactor coils are wound in the same direction (either clockwise or counterclockwise) on the above described core for maximum electrical performance. Since each unit operates in the presence of relatively few laminations, temperature rise is minimized.

Figure 5:
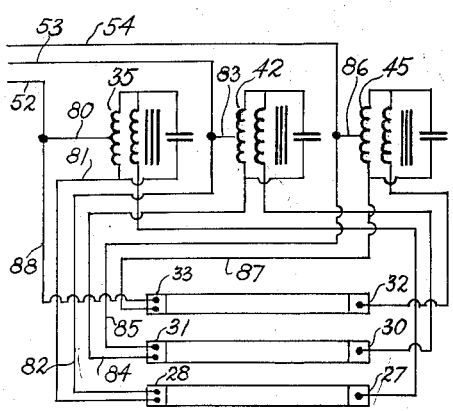
FIG. 5 is a diagram illustrating the components of the device of FIG. 1 connected in a mesh circuit.

In FIG. 5, the three transformer primary windings are shown arranged in a delta circuit, lead 52 being connected through a conductor 80 to the midpoint of autotransformer 38 whereas the opposite end of the autotransformer primary is connected through lead 81 to socket 28 and through conductors 82 and 83 to the midpoint of transformer 42 and lead 53. Likewise: the opposite end of the primary of autotransformer 42 is connected through lead 84 to socket 31 and through conductors 85 and 86 to the midpoint of transformer 45 and lead 54; and the opposite end of the primary of autotransformer 45 is connected through lead 87 to socket 33 and through conductors 88 and 80 back to the midpoint of transformer 38 and lead 52. The condensers and reactors are similar to and are connected as their counterparts in FIG. 4. With this arrangement failure or omission of one or more of lamps 24, 25 and 26 in no way interferes with the operation of any of the others, each of which at all times has impressed across its terminals the voltage between two of lines 52, 53 and 54.

The embodiment of FIGS. 8, 9, 10 and 11 is a simplified modification of the embodiments above described. As shown, this embodiment comprises three transformers 87, 88 and 90 in each of which the primary and secondary windings, designated p and s, are separately positioned. Extending through the openings in each core are laminated iron inserts which act to shunt magnetic flux across the secondary in order to prevent its full application to the secondary. These iron shunts permit separate reactor coils to be omitted by causing a back electromotive force across the secondary that effectively limits current through the secondary. Power factor capacitors 91, 92 and 93 are associated with these transformers and with fluorescent lamps 24, 25 and 26 in a manner to be described below.

Figure 10:
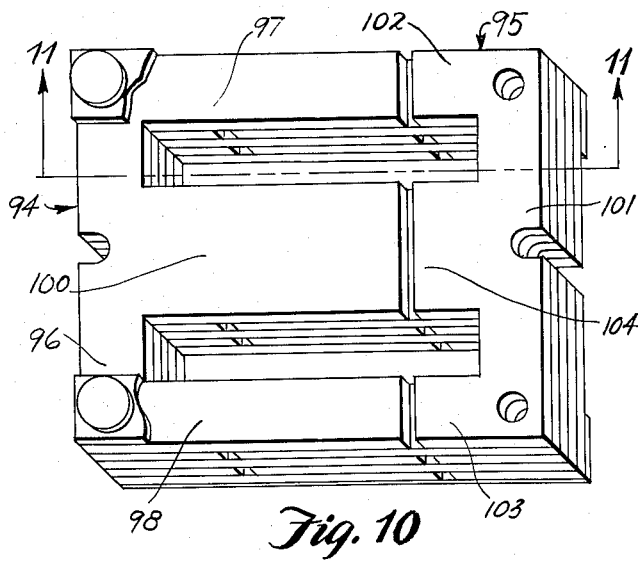
FIG. 10 is a top plan view of a core included in the ballast arrangement of FIG. 8.
Figure 11:
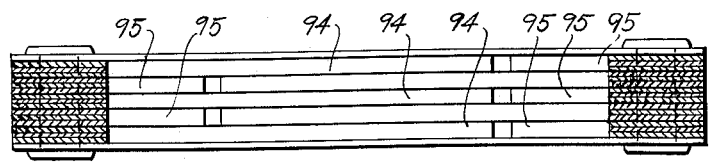
FIG. 11 is a cross sectional view of the core of FIG. 10, the section being taken substantially along the line 11—11.

As shown in FIGS. 10 and 11, the core of each transformer 87, 88 and 90 is fabricated from a plurality of stacks 94 and 95. Each stack 94 includes three registered E-shaped elements each having a trunk 96 and relatively long end branches 97 and 98 and medial branch 100. Each stack 95 includes three registered E-shaped elements each having a trunk 101, and relatively short end branches 102 and 103 and medial branch 104. Stacks 94 and 95 are interleaved with the extremities of their branches in overlapping relation. The arrangement is such that stacks 94 and 95 having branches directed to the right, as viewed in FIGS. 10 and 11, alternate with their trunks in registration. Also, stacks 94 and 95 having branches directed to the left, as viewed in FIGS. 10 and 11, alternate with their trunks in registration. The primary and secondary coils which are pre-wound, envelop opposite ends of the medial cross portion formed by medial branches 100 and 104 and are embraced by trunks 96 and 101 and end branches 97, 98, 102 and 103. The free ends of medial and end branches 100, 97 and 98 are predeterminedly spaced from the free ends of medial and end branches 104, 102 and 103 by a distance which controls the flux applied by the primary to the secondary. Once adjusted these gaps are filled with permanent insulation.

Figure 9:
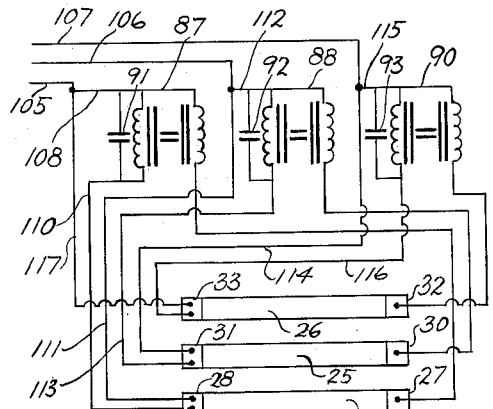
FIG. 9 is a diagram illustrating the components of the device of FIG. 8 connected in a delta circuit.

In FIG. 9, the primary windings of transformers 87, 88 and 90 are shown arranged in a delta circuit, powered through leads 105, 106 and 107 from a three phase alternating current power source. Lead 105 is connected through a conductor 108 to the midpoint of autotransformer 87 whereas the opposite end of the autotransformer primary, which is shunted by capacitor 91, is connected through lead 110 to socket 28 and through conductors 111 and 112 to the midpoint of transformer 88 and lead 106. Likewise; the opposite end of the primary autotransformer 83 is connected through lead 113 to socket 31 and through conductors 114 and 115 to the midpoint of transformer 90 and lead 107; and the opposite end of the primary of autotransformer 90 is connected through lead 116 to socket 33 and through conductors 117 and 108 back to the midpoint of transformer 87 and lead 105. The opposite ends of the secondaries of transformers 87, 88 and 90 are connected to sockets 27, 30 and 32, respectively.

Since certain changes may be made in the above apparatus without departing from the scope of the invention herein involved, it is intended that all matter contained in the above description shall be interpreted in an illustrative and not in a limiting sense.

What is claimed is:

1. An electrical lighting system comprising first fluorescent means, second fluorescent means, third fluorescent means, first input lead means, second input lead means, third input lead means, the first, second and third input lead means being connected to a three phase alternating current source, first autotransformer means, second autotransformer means, third autotransformer means, each of the first, second and third autotransformer means having center tap means, primary tap means and secondary tap means, said first input lead means being connected to the center tap means of said first autotransformer means, said second input lead means being connected to the center tap means of said second autotransformer means, said third input lead means being connected to the center tap means of said third autotransformer means, first reactor inductor means, second reactor inductor means, third reactor inductor means, the primary tap means of said first autotransformer means being connected to one terminal of said first fluorescent means, the secondary tap means of said first autotransformer means being connected to one terminal of said first reactor inductor means, the other terminal of said first reactor inductor means being connected to the other terminal of said first lamp means, the primary tap means of said second autotransformer being connected to one terminal of said second fluorescent means, the secondary tap means of said second autotransformer being connected to one terminal of said second reactor inductor means, the other terminal of said second reactor inductor means being connected to the other terminal of said second lamp means, the primary tap means of said third autotransformer means being connected to one terminal of said third fluorescent means, the secondary tap means of said third autotransformer being connected to one terminal of said third reactor inductor means, the other terminal of said third reactor inductor means being connected to the other terminal of said third lamp means, said one terminal of said first fluorescent means, said one terminal of said second fluorescent means and said one terminal of said third fluorescent means being returned to said system, first magnetic core means, power factor condenser means connected into said system in association with the autotransformer means, second magnetic core means and third magnetic core means, said first magnetic core means being magnetically isolated from said second magnetic core means and said third magnetic core means, said second magnetic core means being magnetically isolated from said first magnetic core means and said third magnetic core means, said third magnetic core means being magnetically isolated from said first magnetic core means and said second magnetic core means, said first autotransformer means and said first reactor inductor means being wound about said first magnetic core means, said second autotransformer means and said second reactor inductor means being wound about said second magnetic core means, said third autotransformer means and said third reactor inductor means being wound about said third magnetic core means.

2. An electrical lighting system comprising a first elongated fluorescent illumination source, a second elongated fluorescent illumination source, a third elongated fluorescent illumination source, a first input lead, a second input lead, and a third input lead, the first, second and third input leads being connected to a three phase alternating current supply, a first autotransformer, a second autotransformer, a third autotransformer, each of the autotransformers having a center tap, a primary tap and a secondary tap, said first input lead being connected to the center tap of said first autotransformer, said second input lead being connected to the center tap of said second autotransformer, said third input lead being connected to a center tap of said third autotransformer, a first reactor inductor, a second reactor inductor, a third reactor inductor, a first power factor condenser, a second power factor condenser, a third power factor condenser, the primary tap of said first autotransformer being connected to one terminal of said first source and to one terminal of said first power factor condenser, the secondary tap of said first autotransformer being connected to the other terminal of the said first power factor condenser and to one terminal of said first reactor inductor the other terminal of said first reactor inductor being connected to the other terminal of said first source, the primary tap of said second autotransformer being connected to one terminal of said second source and to one terminal of said second power factor condenser, the secondary tap of said second autotransformer being connected to the other terminal of said second power factor condenser and to one terminal of said second reactor inductor, the other terminal of said second reactor inductor being connected to the other terminal of said second source, the primary tap of said third autotransformer being connected to one terminal of said third source and to one terminal of said third power factor condenser, the secondary tap of said third autotransformer being connected to the other terminal of said third power factor condenser and to one terminal of said third reactor inductor, the other terminal of said third reactor inductor being connected to the other terminal of said third source, said one terminal of said first source, said one terminal of said second source and said one terminal of said third source being connected together, a first magnetic core having a first component and a second component, a second magnetic core having a first component and a second component and a third magnetic core having a first component and a second component, said first component and said second component of said first magnetic core being magnetically coupled to but mechanically spaced from each other and being magnetically isolated from said second magnetic core and said third magnetic core, said first component and said second component of said second magnetic core being magnetically coupled to but mechanically spaced from each other and being magnetically isolated from said first magnetic core and said third magnetic core, said first component and said second component of said third magnetic core being magnetically coupled to but mechanically spaced from each other and being magnetically isolated from said first magnetic core and said second magnetic core, said first autotransformer being wound about said first component of said first magnetic core, said first reactor inductor being wound about said second component of said first magnetic core, said second autotransformer being wound about said first component of said second magnetic core, said second reactor inductor being wound about said second component of said second magnetic core, said third autotransformer being wound about said first component of said magnetic core, said third reactor inductor being wound about said second component of said third magnetic core.

3. The apparatus of claim 2 wherein each of said cores includes a plurality of registered first E-shaped elements, a plurality of registered second E-shaped elements, and a plurality of registered third E-shaped elements, said first E-shaped elements and said second E-shaped elements being arranged with their branches in interlacing relation, the trunks of said first E-shaped elements being in spaced parallelism with respect to the trunks of said second E-shaped elements, the free ends of the branches of said third E-shaped elements being spaced from adjacent trunks of said second E-shaped elements.

4. An electrical lighting system comprising a first elongated fluorescent illumination source, a second elongated fluorescent illumination source, a third elongated fluorescent illumination source, a first input lead, a second input lead, and a third input lead, the first, second and third input leads being connected to a three phase alternating current supply, a first autotransformer, a second autotransformer, a third autotransformer, each of the autotransformers having a center tap, a primary tap and a secondary tap, said first input lead being connected to the center tap of said first autotransformer, said second input lead being connected to the center tap of said second autotransformer, said third input lead being connected to a center tap of said third autotransformer, a first reactor inductor, a second reactor inductor, a third reactor inductor, a first power factor condenser, a second power factor condenser, a third power factor condenser, the primary tap of said first autotransformer being connected to one terminal of said first source and to one terminal of said first power factor condenser, the secondary tap of said first autotransformer being connected to the other terminal of the said first power factor condenser and to one terminal of said first reactor inductor, the other terminal of said first reactor inductor being connected to the other terminal of said first source, the primary tap of said second autotransformer being connected to one terminal of said second source, and to one terminal of said second power factor condenser, the secondary tap of said second autotransformer being connected to the other terminal of said second power factor condenser and to one terminal of said second reactor inductor, the other terminal of said second reactor inductor being connected to the other terminal of said second source, the primary tap of said third autotransformer being connected to one terminal of said third source and to one terminal of said power factor condenser, the secondary tap of said autotransformer being connected to the other terminal of said third power factor condenser and to one terminal of said third reactor inductor, the other terminal of said third reactor inductor being connected to the other terminal of said third source, said one terminal of said first source, said one terminal of said first source being connected to one of the second and third input leads, said one terminal of said second source being connected to one of the first and third input leads, said one terminal of the third source being connected to one of the first and second input leads, a first magnetic core having a first component and a second component, a second magnetic core having a first component and a second component and a third magnetic core having a first component and a second component, said first component and said second component of said first magnetic core being magnetically coupled to but mechanically spaced from each other and being magnetically isolated from said second magnetic core and said third magnetic core, said first component and said second component of said second magnetic core being magnetically coupled to but mechanically spaced from each other and being magnetically isolated from said first magnetic core and said third magnetic core, said first component and said second component of said third magnetic core being magnetically coupled to but mechanically spaced from each other and being magnetically isolated from said first magnetic core and said second magnetic core, said first autotransformer being wound about said first component of said first magnetic core, said first reactor inductor being wound about said second component of said first magnetic core, said second autotransformer magnetic core, said second reactor inductor being wound about said second component of said second magnetic core, said third autotransformer being wound about said first component of said third magnetic core, said third reactor inductor being wound about said second component of said third magnetic core.

5. The apparatus of claim 4 wherein each of said cores includes a plurality of registered first E-shaped elements, a plurality of registered second E-shaped elements, and a plurality of registered third E-shaped elements, said first E-shaped elements and said second E-shaped elements being arranged with their branches in interlacing relation, the trunks of said first E-shaped elements being in spaced parallelism with respect to the trunks of said second E-shaped elements, the free ends of the branches of said third E-shaped elements being spaced from adjacent trunks of said second E-shaped elements.

6. An electric lighting apparatus comprising a first elongated fluorescent illumination source, a second elongated fluorescent illumination source and a third elongated fluorescent illumination source, a first transformer having a primary winding and a secondary winding, a second transformer having a primary winding and a secondary winding, a third transformer having a primary winding and a secondary winding, a first input lead, a second input lead, a third input lead, a first power factor condenser, a second power factor condenser, a third power factor condenser, said first input lead being connected to adjoining terminals of the primary and secondary windings of said first transformer, said second input lead being connected to adjoining terminals of the primary and secondary windings of said second transformer, said third input lead being connected to the primary and secondary windings of said third transformer, the other terminal of said primary winding of said first transformer being connected to one terminal of said first source, the other terminal of said primary winding of said second transformer being connected to one terminal of said second source, the other terminal of said primary winding of said first transformer being connected to one terminal of said first source, the other terminal of primary winding of said second transformer being connected to one terminal of said second source, the other terminal of said primary winding of said third transformer being connected to one terminal of said third source, the other terminal of said secondary winding of said first transformer being connected to the other terminal of said first source, the other terminal of said secondary winding of said second transformer being connected to the other terminal of said second source, the other terminal of said secondary winding of said third transformer being connected to the other terminal of said third source, and three phase means for returning said one terminal of said first source, said one terminal of said second source, said one terminal of said third source to said system, said first power factor condenser being connected across said primary winding of said first transformer, said second power factor condenser being connected across said primary winding of said second transformer, said third power factor condenser being connected across said primary winding of said third transformer, a first magnetic core, a second magnetic core and a third magnetic core, said first magnetic core being magnetically isolated from said second magnetic cores and said third magnetic core, said second magnetic core being magnetically isolated from said first magnetic core and said third magnetic core, said third magnetic core being magnetically isolated from said first magnetic core and said second magnetic core, one each of said magnetic cores providing one each a medial flux path and a pair of return flux paths on opposite sides thereof, opposite ends of said return paths communicating magnetically with opposite ends of said medial path, said primary winding and said secondary winding of said first transformer being disposed at opposite ends of the medial path of said first magnetic core, said primary winding and said secondary winding of said second transformer being disposed at opposite ends of the medial path of said second magnetic core, said primary winding and said secondary winding of said third transformer being disposed at opposite ends of the medial path of said third magnetic core, one each of said magnetic cores including one each a pair of flux shunts, one each of said flux sheets being positioned one each between said medial flux path and one of said return flux paths, one each of said flux shunts being positioned one each said medial flux path and the other of said return flux paths.

References Cited in the file of this patent

UNITED STATES PATENTS

| | | |
|---|---|---|
| 2,549,288 | Bridges | Apr. 17, 1951 |
| 2,565,110 | Adams | Aug. 21, 1951 |
| 2,664,541 | Henderson | Dec. 29, 1953 |
| 2,683,798 | Craig | July 13, 1954 |
| 2,714,653 | Lemmers | Aug. 2, 1955 |